Patented July 7, 1953

2,644,761

UNITED STATES PATENT OFFICE 2,644,761

METALLIZED PLASTIC FOIL

John P. McGirr, Brooklyn, N. Y., assignor to Theodore G. McGirr, Brooklyn, N. Y.

No Drawing. Application November 3, 1950, Serial No. 194,025

5 Claims. (Cl. 106—177)

This invention relates to metallized plastic foils and more particularly to a metallized plastic foil suitable for use as a wrapping material or the like.

Wrapping materials previously proposed have been made from plastic materials containing various metal pigments or from metal foils. However, such wrapping materials do not have a high tensile strength nor are they moisture-proof. The wrapping material of the present invention has the appearance of metal foil and yet has a high tensile strength, is moisture-proof and highly ornamental.

An object of the present invention is to provide a metallized plastic material suitable for use as a wrapping material in the form of a soft pliable foil having a uniform metallic appearing surface.

Another object of the present invention is to provide a wrapping material having the appearance of metal foil and affording insulation to protect the wrapped article against ordinary changes of temperature, yet is sufficiently conductive to permit quick freezing of the wrapped article.

A further object of the present invention is to provide a novel metallized plastic material, which can be formed into a thin web from which the solvents may be withdrawn, leaving a soft pliable film having a smooth uniform metallic appearance.

A still further object of the invention is to provide metallized plastic foils of various colors which may be used for decorative purposes.

Other objects and the nature and advantages of the instant invention will be apparent from the following description.

According to the invention, a doughy mass of plastic material containing a substantial quantity of metallic flakes is formed into a film at a controlled temperature. As the solvents in the mixture are withdrawn, the resultant film dries and seasons to form a soft, silky, pliable plastic foil with the metal flakes dispersed throughout the plastic. These flakes are sufficiently concentrated at or near the surfaces of the foil to produce a uniform metallic appearance. By varying the amount and type of metal flakes utilized, various shades and colors can be obtained simulating gold foil, silver foil, tin foil and the like.

Preferably, the plastic material used is cellulose acetate, although other plastic materials can be used alone or in combination with the cellulose acetate. The plastic material is preferably used in powdered form, for more rapidly and completely dissolving in the solvent. Any suitable solvent, or mixture of solvents may be used including acetone, ethyl alcohol, methylene chloride and the like. A mixture which has been found satisfactory as a solvent consists of nine parts methylene chloride to one part ethyl alcohol.

The dissolved plastic material is mixed with a suitable plasticizer. Among the plasticizers which are suitable are: dimethyl phthalate, diethyl phthalate, diallyl phthalate, dioctyl phthalate, methyl phthalyl ethyl glycolate, ethyl phthalyl ethyl glycolate, diethyl succinate, dibutyl succinate, dibutyl tartrate, tri-n-butyl citrate, triethyl citrate, glycerol diacetate, glycerol tripropionate and the like, or mixtures thereof.

A suitable phosphate may be added if desired to improve the properties of the resultant foil, although such addition is not essential to the invention. The phosphate acts as a co-plasticizer and fire resisting agent. Among the phosphates which may be added are triethyl phosphate, an alkyl aryl phosphate such as cresyl diphenyl phosphate, tricrenyl phosphate, triphenyl phosphate and tributoxyethyl phosphate. The addition of a small quantity of a softener such as glycerine, soap flakes, glycol and the like enhances the soft texture of the foil.

Metal flakes are then added to the mixture. Among those which can be used are aluminum flakes, copper flakes, bronze flakes, gold flakes, other alloyed metal flakes, and mixtures of these. By varying the quantity and types of metal flakes utilized, various brilliant metallic colors can be obtained which simulate the colors of gold foil, silver foil, bronze foil and so on.

The mixture is thoroughly mixed at a temperature of approximately 45° C., and is then formed into a thin film. The resulting film is seasoned by withdrawing the solvents and excess plasticizers. The resulting seasoned film is a soft pliable foil having the appearance of metal foil and suitable for many uses.

Depending upon the exact characteristics desired in the product, the proportions of the ingredients may be varied within wide limits:

| | Percent |
|---|---|
| Dissolved plastic material | 30 to 65 |
| Plasticizers and softener | 15 to 50 |
| Metal flakes | 5 to 20 |
| Solvent | as required. |

Satisfactory metallized plastic foils may be obtained by variously proportioned mixtures within the above limits. Satisfactory results are obtained with varying amounts of softener in the neighborhood of 1% by weight of the mixture.

The invention can be further illustrated by the following specific examples of mixtures which are intended to illustrate the present invention but are not intended to limit the same.

Example I

| | Percent by weight |
|---|---|
| Cellulose acetate | 45 |
| Diethyl phthalate | 24.8 |
| Dimethyl phthalate | 19.5 |
| Aluminum flakes | 18.0 |
| Glycerine | 0.7 |
| Acetone | as required. |

Example IA

| | Percent by weight |
|---|---|
| Cellulose acetate | 45 |
| Diethyl phthalate | 24.8 |
| Dimethyl phthalate | 19.5 |
| Aluminum flakes | 10.0 |
| Glycerine | 0.7 |
| Acetone | as required. |

Example II

| | Grammes |
|---|---|
| Cellulose acetate | 50 |
| Diethyl phthalate | 9 |
| Dimethyl phthalate | 6 |
| Triethyl phosphate | 12 |
| Statuary bronze flakes | 20 |
| Glycerine | 1 |
| Acetone | 17 |

Example III

| | Grammes |
|---|---|
| Polyvinyl resin | 15 |
| Cellulose acetate | 35 |
| Methyl phthalyl ethyl glycolate | 15 |
| Alkyl aryl phosphate | 18 |
| Methylene chloride and ethyl alcohol (ratio 9:1) | 18 |
| Brilliant copper flakes | 20 |

Example IV

| | Grammes |
|---|---|
| Cellulose acetate | 50 |
| Methyl phthalyl ethyl glycolate | 15 |
| Alkyl aryl phosphate | 18 |
| Triethyl phosphate | 12 |
| Glycerine | 1 |
| Acetone | 17 |
| Alloyed metal flakes | 13 |

The alloyed metal flakes utilized can be varied to obtain various colors. As examples are the following:

| | Grammes |
|---|---|
| Statuary bronze flakes | 5 |
| Gold flakes | 6 |
| Aluminum flakes | 7 |

This mixture results in a foil having a light bronze color.

| | Grammes |
|---|---|
| Aluminum flakes | 5 |
| Statuary bronze flakes | 3 |
| Copper flakes | 3 |
| Gold flakes | 7 |

This mixture yields a product having an old lavender color.

| | Grammes |
|---|---|
| Brilliant copper flakes | 7 |
| Aluminum flakes | 11 |

This mixture gives a foil having a silver color.

| | Grammes |
|---|---|
| Karat gold flakes | 7 |
| Aluminum flakes | 11 |

This mixture results in a foil having a bright silver color.

| | Grammes |
|---|---|
| Brilliant copper flakes | 4 |
| Gold flakes | 6 |
| Aluminum flakes | 8 |

This combination of metals gives a foil the color of old silver.

The metallized plastic foil produced in accordance with the present invention has the actual appearance of metal, not a mere metallic coloring which is the normal result of the addition of a metal pigment. This is due to the use of metal in flake form, that is, having a flat sheet-like character rather than a granular form. It has been found that such metal flakes produce a surface having a uniform metallic appearance. The metals added may be entirely in flake form or they may be a mixture of flake with a small amount of paste.

It is understood that the foregoing examples may have mixed therein compatible dyes or coloring pigments, also any other media may be added for the purpose of obtaining other physical characteristics, such as determination of drying time, durability, hardness, etc.

Any of the mixtures mentioned above can be spread or otherwise formed into a thin film. This film, upon being properly cured or seasoned, results in a metallized plastic foil which is particularly useful as a wrapping material. The desirable characteristics of softness and pliability do not seem to be materially affected by different thicknesses of foil. However, for use as a wrapping material, a foil having a thickness of between .001 of an inch and .01 of an inch is preferred.

The metallized plastic foils produced according to the present invention are not only soft and pliable so that they can be readily used to wrap variously shaped articles, but their surfaces are uniformly colored according to the metal or metals used. Thus, the material of the present invention has the appearance of a metal wrapping material and the advantageous physical characteristics of a plastic foil.

In addition to its attractive appearance, this material is particularly suitable for a wrapping material because it has a high tensile strength, is substantially moisture-proof, and has a very low moisture absorption rate. Furthermore, the metallized plastic foil is self-welding, that is, it may be welded to itself by the application of proper heat and pressure to form an excellent seal. This metallized plastic foil has the advantage of a plastic in that it is light in weight and provides adequate insulation to protect wrapped articles against adverse effects of changes in temperature, yet it has the advantages of metal materials in that it has a metallic appearance and is sufficiently heat conductive to quick freeze wrapped articles.

This application is a continuation in part of applicant's copending application, Serial Number 740,491, filed April 9, 1947 and now abandoned.

It will be obvious to those skilled in the art that various changes can be made without departing from the spirit of the invention and therefore the invention is not limited to what is

What I claim is:

1. A metallized plastic wrapping material in the form of a thin plastic film having a uniform metallic appearance, comprising cellulose acetate 30 to 65%, plasticizers 15 to 49%, metal flakes 5 to 20% and up to 1% of a softener, said metal flakes being selected from the group consisting of aluminum, copper, gold, bronze, and mixtures thereof.

2. A metallized plastic wrapping material in the form of a thin plastic film consisting of cellulose acetate 45%, diethyl phthalate 24.8%, dimethyl phthalate 19.5%, aluminum flakes 10% and glycerine 0.7%.

3. A metallized plastic wrapping material in the form of a thin plastic film comprising cellulose acetate 50 parts, plasticizer 15 parts, a mixture of triethyl phosphate and cresyl diphenyl phosphate 30 parts, metal flakes 18 parts, and glycerine 1 part, said metal flakes being selected from the group consisting of aluminum, copper, gold, bronze, and mixtures thereof.

4. A metallized plastic wrapping material in the form of a thin plastic film comprising cellulose acetate 50 parts, plasticizer 15 parts, organic phosphate co-plasticizer and fire resisting agent 12 to 30 parts, metal flakes 18 to 20 parts and softener 1 part, said metal flakes being selected from the group consisting of aluminum, copper, gold, bronze, and mixtures thereof.

5. A metallized plastic wrapping material in the form of a thin plastic film consisting of cellulose acetate 30 to 65%, a mixture of diethyl phthalate and dimethyl phthalate 15 to 49%, metal flakes 5 to 20% and glycerine up to 1%, said metal flakes being selected from the group consisting of aluminum, copper, gold, bronze, and mixtures thereof.

JOHN P. McGIRR.

References Cited in the file of this patent

UNITED STATES PATENTS

| Number | Name | Date |
|---|---|---|
| 2,445,374 | Van Wyck | July 20, 1948 |
| 2,472,680 | Pratt | June 7, 1949 |
| 2,543,536 | Sherman | Feb. 27, 1951 |

FOREIGN PATENTS

| Number | Country | Date |
|---|---|---|
| 9,261 | Great Britain | of 1894 |
| 126,989 | Great Britain | May 29, 1919 |
| 113,072 | Australia | May 9, 1941 |